(12) United States Patent
Godøy

(10) Patent No.: US 12,384,496 B2
(45) Date of Patent: Aug. 12, 2025

(54) STEERING OF MARINE EQUIPMENT TOWED BY A VESSEL BY FLOAT WITH WINGS

(71) Applicant: SHEARWATER INVEST AS, Laksevåg (NO)

(72) Inventor: Erik Godøy, Nesbru (NO)

(73) Assignee: SHEARWATER INVEST AS, Laksevåg (NO)

( * ) Notice: Subject to any disclaimer, the term of this patent is extended or adjusted under 35 U.S.C. 154(b) by 0 days.

(21) Appl. No.: 17/908,683

(22) PCT Filed: Mar. 3, 2021

(86) PCT No.: PCT/NO2021/050053
§ 371 (c)(1),
(2) Date: Sep. 1, 2022

(87) PCT Pub. No.: WO2021/182966
PCT Pub. Date: Sep. 16, 2021

(65) Prior Publication Data
US 2023/0102028 A1    Mar. 30, 2023

(30) Foreign Application Priority Data

Mar. 11, 2020   (NO) .................................. 20200297

(51) Int. Cl.
*B63B 21/66* (2006.01)
*G01V 1/38* (2006.01)

(52) U.S. Cl.
CPC ............ *B63B 21/66* (2013.01); *G01V 1/3826* (2013.01)

(58) Field of Classification Search
CPC ...... G01V 1/3826; B63B 21/62; B63B 21/66; B63B 35/68
USPC ............................................. 367/17; 114/246
See application file for complete search history.

(56) References Cited

U.S. PATENT DOCUMENTS

| 5,357,892 | A  | * | 10/1994 | Vatne .................. | A01K 73/045 |
|           |    |   |         |                        | 114/244     |
| 9,151,859 | B2 | * | 10/2015 | Martin ................ | G01V 1/3826 |
| 9,581,714 | B2 | * | 2/2017  | Barral ................ | G01V 1/3817 |
| 10,259,537| B2 | * | 4/2019  | Hurlen ................ | A01K 73/04  |

(Continued)

FOREIGN PATENT DOCUMENTS

EP           0262951 A2 *  4/1988 ........... G01V 1/3826

*Primary Examiner* — Isam A Alsomiri
*Assistant Examiner* — Abdallah Abulaban
(74) *Attorney, Agent, or Firm* — Flener IP & Business Law; Zareefa B. Flener

(57) ABSTRACT

The present invention relates to the field of marine towing operations for marine seismic survey systems and seismic data gathering. More specifically, the present invention relates to seismic sources and receiver sensor cables, streamers, floats etc., that have means for adjusting and keeping a desired position in an array during a tow behind a vessel. The apparatus comprises a body (10) with means for being towed behind a vessel, means for connecting with and supporting and steering submerged marine seismic equipment laterally in the water and means for remote control from vessel. The body (10) of the apparatus has a forward positioned float unit (16) with an elongated rear float (12) hinged at the rear of the forward float. The forward float unit has vertical wings (18, 18') with means for adjusting angle of attack in water.

6 Claims, 7 Drawing Sheets

(56) References Cited

U.S. PATENT DOCUMENTS

| | | | |
|---|---|---|---|
| 11,077,920 B2 * | 8/2021 | Martin | B63B 1/242 |
| 2006/0176774 A1 * | 8/2006 | Toennessen | G01V 1/3861 |
| | | | 367/16 |

* cited by examiner

STEERING OF MARINE EQUIPMENT TOWED BY A VESSEL BY FLOAT WITH WINGS

FIELD OF THE INVENTION

The invention is related to the field of marine towing operations. More specifically to a marine seismic survey systems and seismic data gathering, wherein seismic sources and receiver sensor cables, streamers, floats etc., have means for adjusting and keeping a desired position in an array during a tow behind a vessel.

DESCRIPTION OF RELATED ART

In the field of seismic marine surveying, acoustic energy is generated by seismic sources such as air guns. The pressure pulses propagate downwardly to the seabed and deeper geological layers. The reflected pulses are registered by the receiver sensors attached to cables and seismic streamers. This data is then processed to map the underlying geological structures. There will be several streamers towed behind the vessel forming an array covering a large area and the length of streamer cables towed by the vessel are often up to 10-12 kilometres. The area (grid) is often a lot wider than the towed array, so the vessel must turn and tow the array in lapses across the grid. A multiple streamer array and sources are dependent on means for directing and positioning the streamer cables outwardly with a set distance between them and positioning the source array correctly. Also, the towed array and vessel, will be subject to wind, waves and currents which will affect the position of different components of the towed array. To pull streamers outwardly from the vessel and control the position of the source array it is well known to use of means like otterboards, deflectors/diverters, wings/fins, rudders etc., either in a fixed position or adjustable by different means of which the following prior art discloses.

GB 2122562 (Breugelmans, pub. Date: Jan. 18, 1984) describes a paravane/trawl door with a hydrofoil profile with motoring means for controlling bridles and the angle of attack when towed through the water, the trawl door designed for lateral deflecting of a seismic source/streamer array.

EP 0018053 (Lamb, (Shell) patent Dec. 7, 1983) describes a manual or automatic positioning of seismic sources by using floats with remotely adjustable rudders/fins.

WO 98/24685 (Russel, pub. Date: Jun. 11, 1998) describes a system with active deflectors in a seismic streamer array where there are adjustable fins on deflector but also depend on a support vessel.

WO 2004/086092 (Helgerud et al. pub. Date: Oct. 7, 2004) describes a system and adjustment of deflectors in a seismic streamer array, by changing the bridle angle and tow points of deflector door. The adjustments are made by hydraulic and or motoring means. Reference is made to U.S. Pat. No. 5,357,892, Vatne.

U.S. Pat. No. 3,331,050 (Kilmer, patent Jul. 11, 1967) describes the use of submerged paravanes with wings and or rudders to support and control position of seismic sources.

U.S. Pat. No. 4,574,723 (Chiles et al. patent Mar. 11, 1986) discloses a paravane handling system and mechanism for controlling a wing shaped paravane or deflector.

U.S. Pat. No. 7,404,370 (Stokkeland, Jul. 29, 2008) discloses a paravane with float and steerable diverter for lateral force in a seismic streamer array.

U.S. Pat. No. 8,100,078 (Storteig et al., patent Jan. 24, 2012) discloses a steerable hydrofoil for remotely control of streamers and position of other marine seismic equipment.

The following publications disclose different systems for controlling the seismic source arrays independently of the streamer array in a combined tow.

U.S. Pat. No. 8,462,581 (Langeland, patent Jun. 11, 2013) describes that both the laterally and or longitudinally position of the source arrays between vessel and outward deflectors can be controlled by the means of wire and winching system.

U.S. Pat. No. 7,415,936 (Storteig et al., patent Aug. 26, 2008 discloses a seismic survey system using one or more winches placed on vessel or within the tow in the water for adjusting the source array.

U.S. Pat. No. 8,228,756 (Toennesen, patent Jul. 24, 2012) discloses apparatus and method for remotely controlling position of a source array using active deflectors in a seismic streamer array. Prior art of deflectors is described along with methods for adjustable fins on deflectors both on lateral lead for streamers and for source array.

U.S. Pat. No. 9,696,446 (Howlid et al., patent Jul. 4, 2017.) describes almost the same features as the above mentioned patents with regards to deflectors and adjustment of wings, rudders, and a winch to the tow cable between the tow vessel and the source-array. This publication has a broad listing of prior art.

U.S. Pat. No. 337,413 (Stokkevçg, Rolls Royce Marine AS, patent Apr. 11, 2016.) discloses a flexible float comprising a head member, a plurality of connection members and a tail member; all said members connected by a tubular flexible float member, whereas depth control of the seismic equipment is made by use of winches powered by pressurized air.

Use of otterboards, wings, diverters, trawl doors as used in the fishing industry and such other type deflectors are widely used and has been used for decades. However, it is a method which has its limitation with regards to accurate positioning of seismic equipment in the water as it is totally dependent on the speed of tow. However as shown in prior art paravanes, floats and deflectors have been shown with adjustable rudders/fins which comprise of rather many parts and are quite complex. To adjust the source array and streamer array independently, will demand for a number of deflectors and therefore may be a complex and costly solution.

By use of winches in the water as shown by U.S. Pat. Nos. 7,415,936 and 9,696,446 would be complex and could be a disadvantage regarding maintenance.

The inventor seeks to present a simple and easy system and apparatus for control of a seismic survey system and to solve the limitations of prior art.

BRIEF SUMMARY OF THE INVENTION

The invention, apparatus and system for steering of a seismic source array, comprise of a steerable float for support of seismic guns. The float has a head unit with deflector wings/fins and means for remotely adjustable angle. The said means are either of a wire and winch system or by use of a hydraulic or motorized actuator.

The invention therefore seeks to present a simpler alternative to present art.

BRIEF DESCRIPTION OF THE DRAWINGS

The foregoing aspects and many of the advantages of the present invention will be more appreciated and better understood by reference to the following detailed description, when taken in conjunction with the accompanying drawings, wherein.

DETAILED DESCRIPTION OF THE INVENTION

Figure 1:
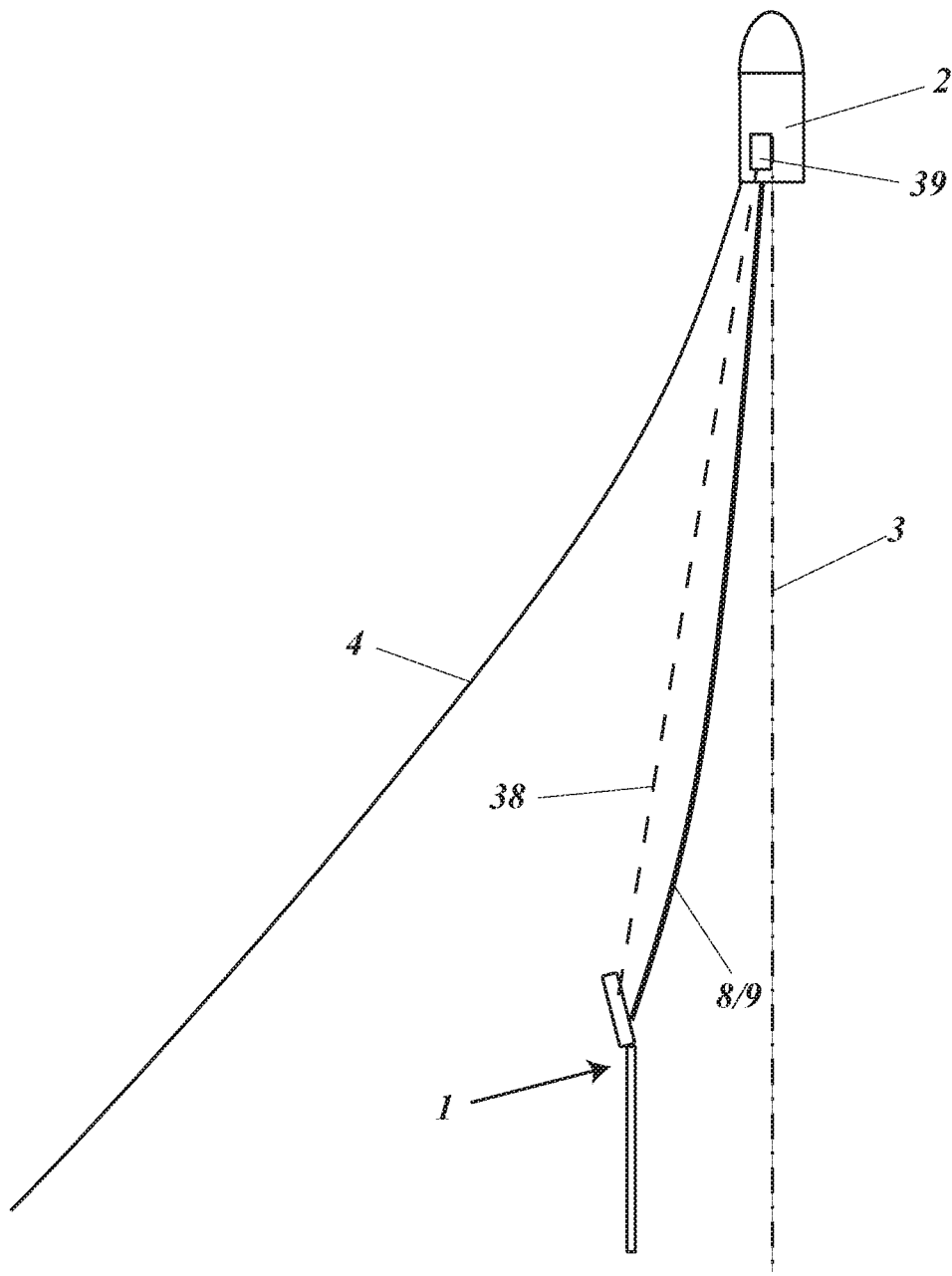
FIG. 1 shows overview of float with source towed behind a vessel.

Disclosed in FIG. 1 is shown an embodiment of the invention, representing a type float and deflector device 1 for use in marine seismic survey systems and seismic data gathering, wherein the inventive head float unit is part of a float for seismic sources (seismic guns) towed behind a vessel 2 as part of a seismic survey array. There will be typically at least three of these sources on either side of centreline 3, each of the outer having means for steering according to the invention. Seismic receiver sensor cables, streamers, are deflected and towed further behind the source array, not shown but in a manner as known from prior art. Numeral 4 is lead cable lateral deflected for spread of streamer array, not shown. Denoted number 3 is a centreline, whereas everything is mirrored.

Figure 2:
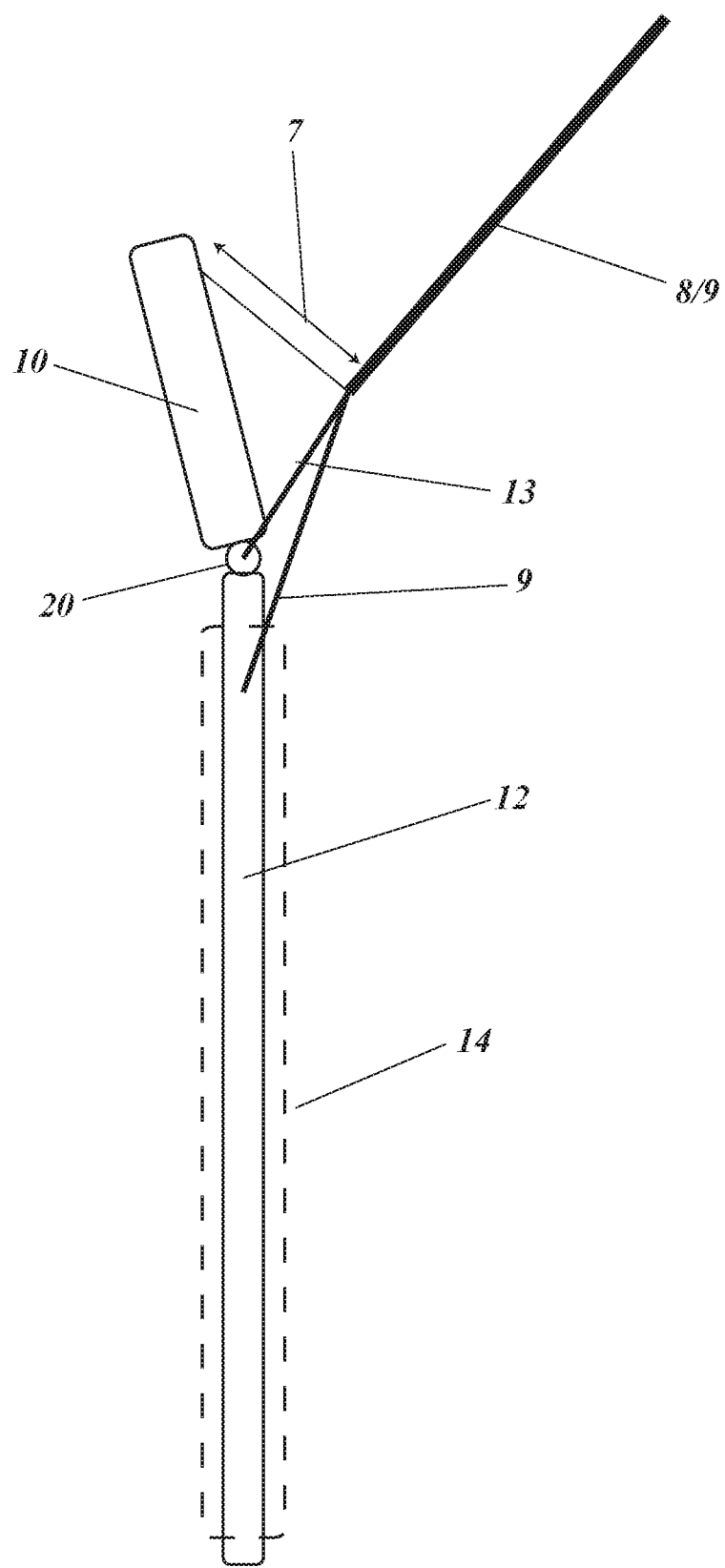
FIG. 2 shows overview of the float and head unit according to the invention.
Figure 3:
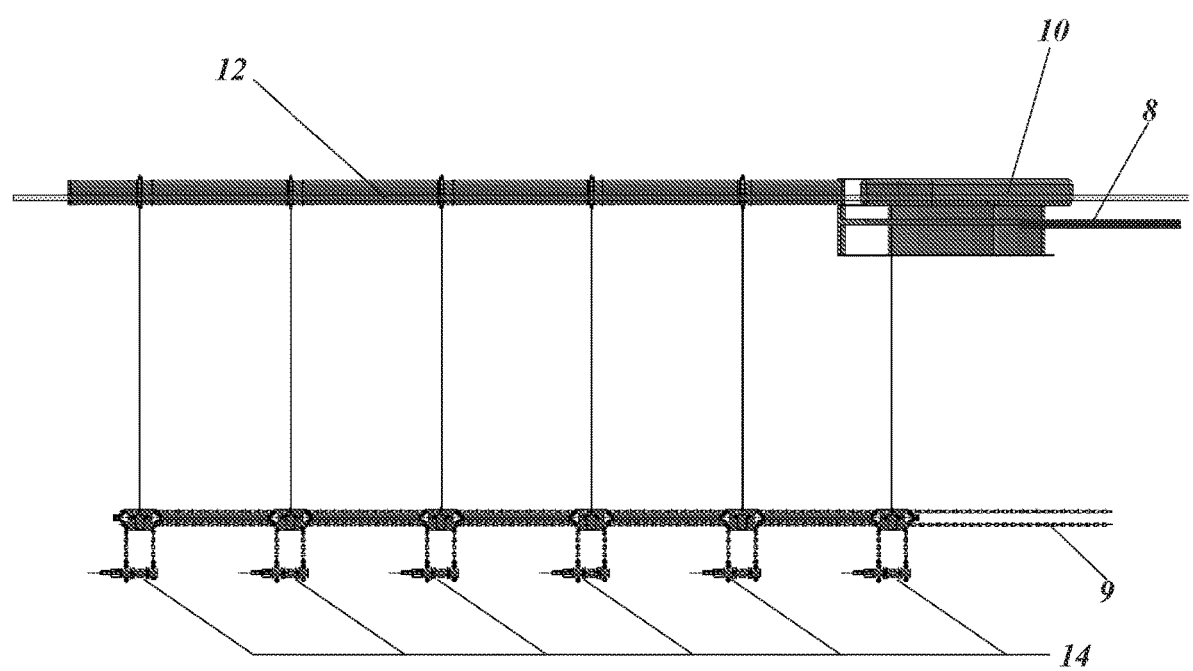
FIG. 3 shows a side view of the float and head unit and supported seismic gun set up.
Figure 4:
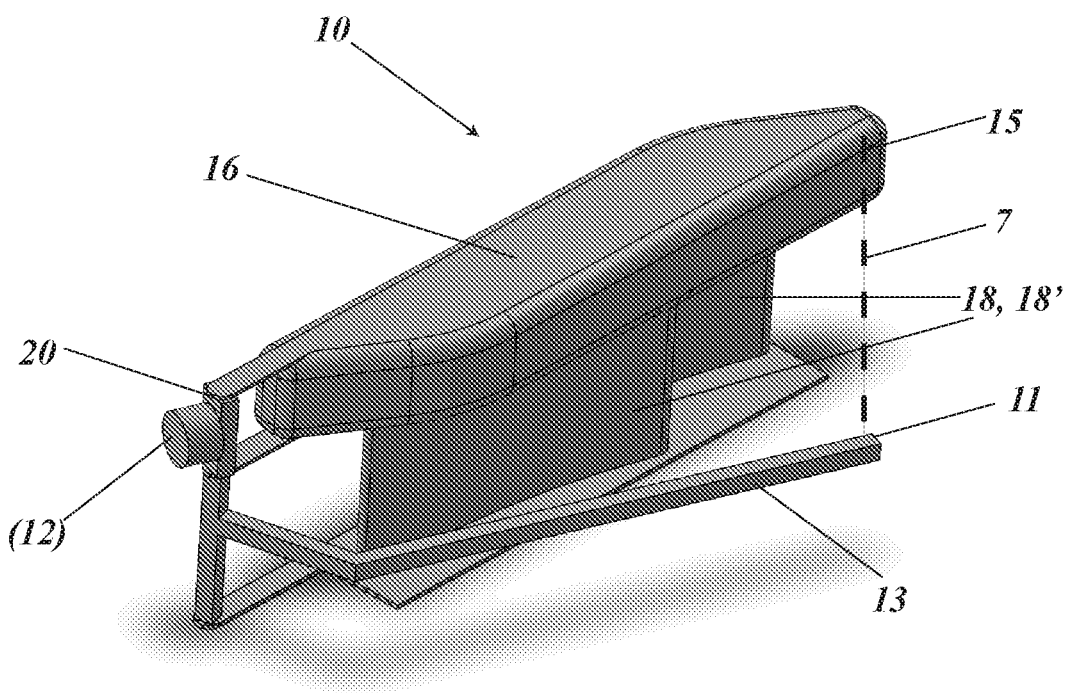
FIG. 4 shows a perspective view of the head unit of float.

FIG. 2 shows an overview of the float 1 which has a head 10 linked to an air-filled tube 12 which supports the submerged seismic guns 14. The tube is flexible in the lateral direction. Numeral 8 denotes the tow cable and umbilical 9, whereas the tow cable is fixed at end 11 of bar 13. As further disclosed in FIGS. 3 and 4, the head 10 has a float unit 16 with deflector wings 18, 18' underneath. The tube 12 is fixed on a hinge 20 at the rear of float unit 10.

Figure 5:
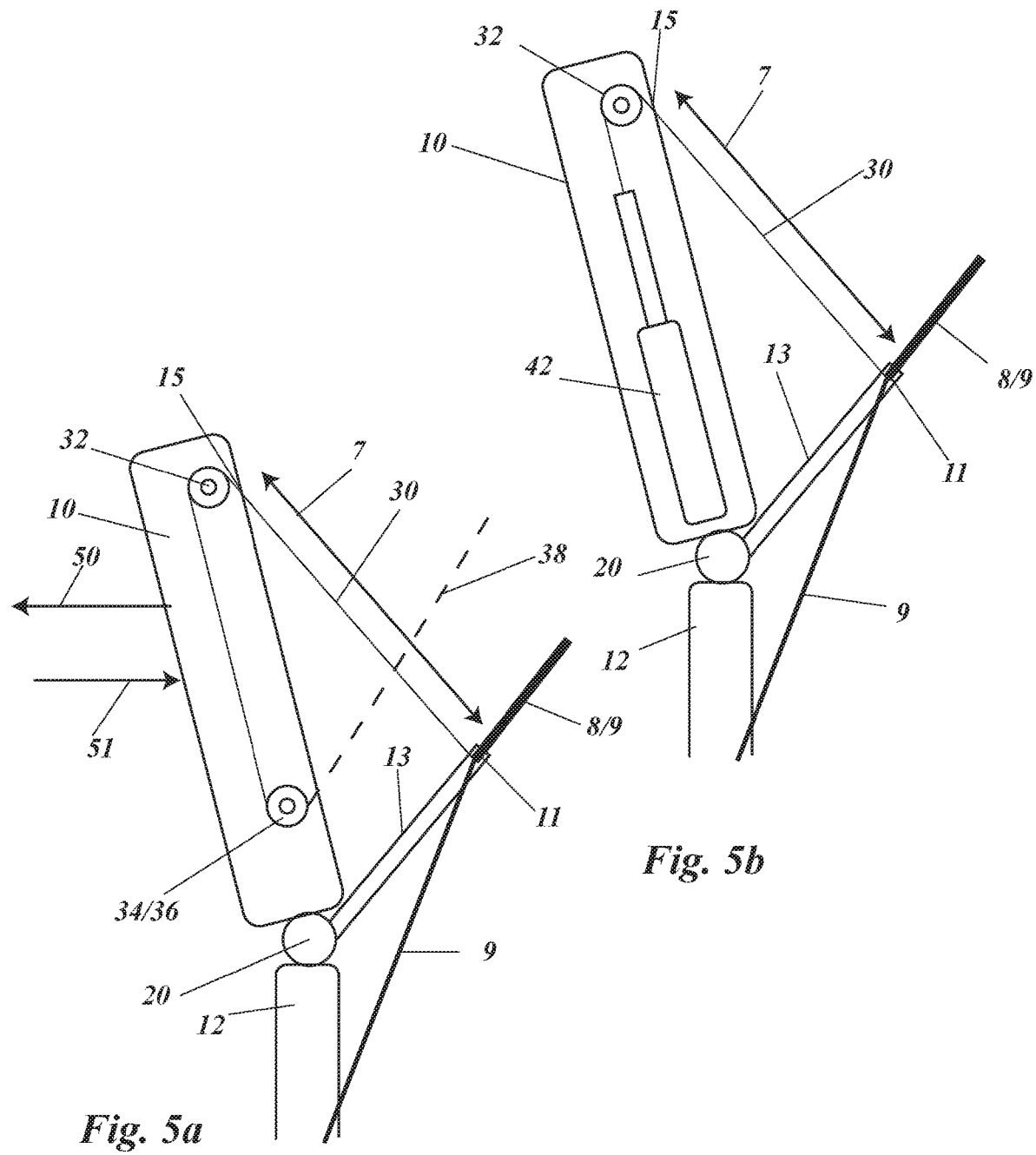
FIGS. 5a-5b illustrate means for steering of invention.

Adjusting the head of float 10 angle of attack in the water is performed by adjusting the length 7 between 11 and fixing point 15. FIG. 5a shows a wire 30 fixed at bar 11/13 running on wheel 32 to a reel 34 which in one embodiment can be motorized, controlled from vessel. Another solution is that the wire runs on wheel 36 and further to the vessel as indicated by numeral 38, pulled from the vessel 2 by an on-board winch 39.

The wire 30 may in another embodiment, be pulled by a hydraulic or electric actuator 42 as indicated in FIG. 5b.

Outward lateral force, illustrated by arrow 50, and movement of deflector head 10 is created by force of the water from forward pull through the water. Moving the deflector head laterally inward, illustrated by arrow 51, is done by pull of wire 30 by any of the shown embodiments.

Figure 6:
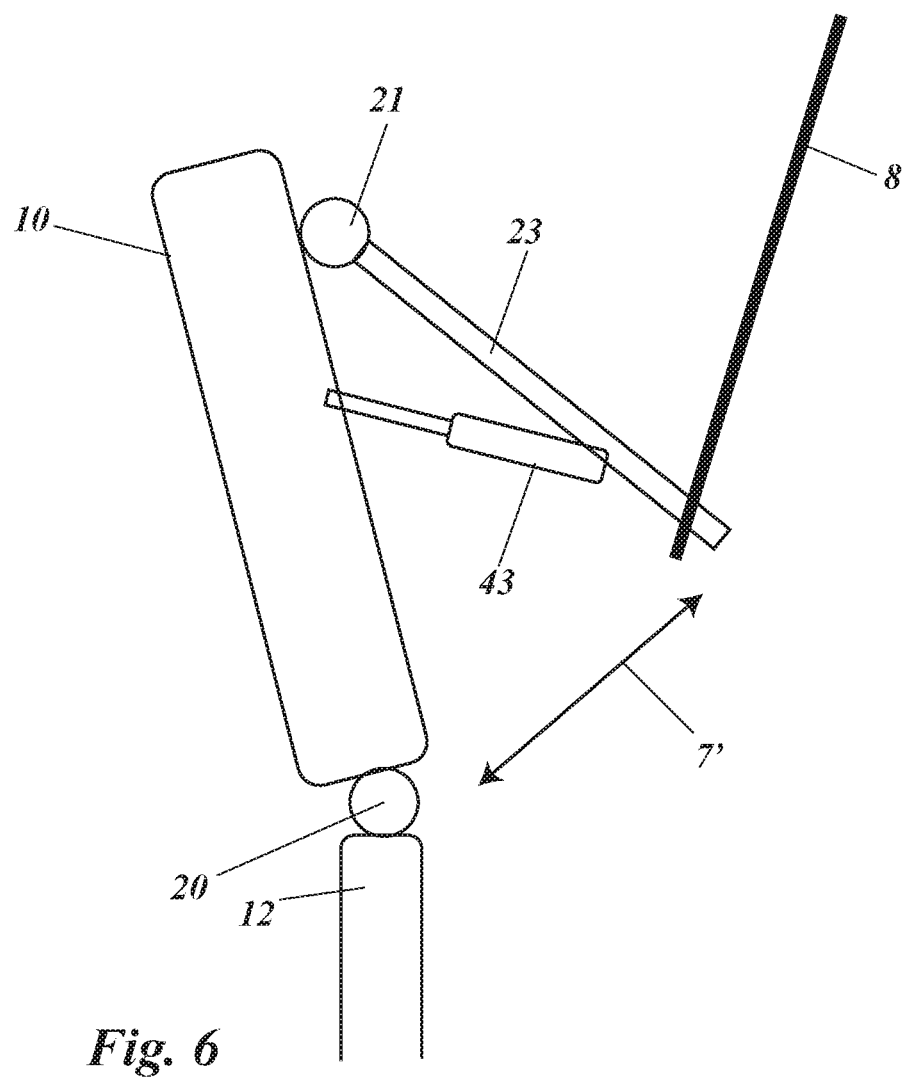
FIG. 6 illustrate another embodiment for steering of the invention.

FIG. 6 shows an embodiment utilizing an actuator 43 without use of wire. A bar 23 is hinged at point 21 to head float and deflector unit 10 and to tow 8. An actuator 43 is connected to bar 23 and unit 10. Powering the actuator 43, changes the distance 7' between unit 10 and bar 23 and the angle of head float 10 and attack of deflector wings.

Figure 7:
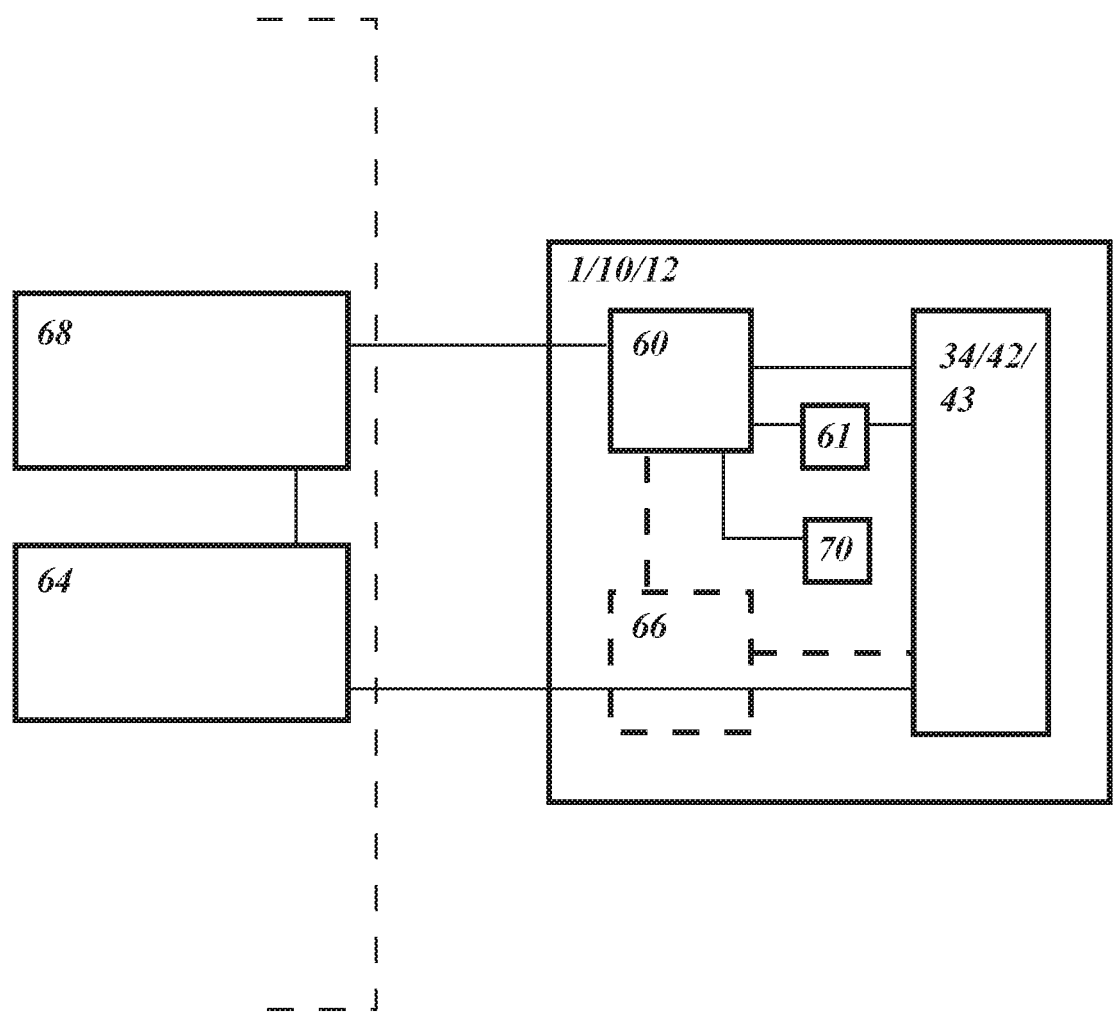
FIG. 7 illustrate by block schematic, remote control of float and head float unit.

FIG. 7 illustrates the remote control system of the invention. Float unit 1(10/12) as illustrated by FIGS. 5a and 5b, show embodiments using a reel 34 or actuator 42/43 for steering of the float head 10. The reel 34 and actuator 42/43 are connected to a local control unit (relay) 60 and sensor 61, the latter for reading of angle of attack. Power 64 is provided directly from vessel or locally from battery 66. Master control unit 68 of the system is placed on vessel and connected with float 1 by cable or a wireless radio system. Also, a position detector 70 is placed on float 1, for the positioning of float within the towed array.

With reference to FIGS. 5a and 7, it is understood that the float steering mechanism using remote wire pull from vessel, also will have a sensor and position detector.

An embodiment using a hydraulic system will have a similar set up, the electric power system exchanged with hydraulic hoses, as will be obvious for anyone familiar with this art.

The invention therefor by these disclosures enables adjusting and keeping a desired position of a source array during the tow and operation.

The invention described can be subject to modifications and variations without thereby departing from the scope of the inventive concept as disclosed with reference to the drawings and further stated in the claims. To the extent that certain functional elements can be replaced by other elements to enable the same function to be performed by the various embodiments disclosed, such technical equivalents are included within the scope of the invention.

The invention claimed is:

1. An apparatus for guiding marine seismic equipment when towed behind a vessel at sea, the apparatus comprising;

a body (10) to be towed by a vessel (2), wherein the body (10) is connectable to and supports submerged marine equipment (14), wherein the body (10) is used to steer said marine seismic equipment (14) laterally in the water, and wherein the body (10) is remotely controlled from the vessel (2);

the body (10) comprising of:

a forward positioned float unit (16) with an elongated rear float (12) of tubular design and flexible in a lateral direction, the elongated rear float (12) attached by a hinge (20) to a rear of the forward positioned float unit (16), wherein the hinge (20) is mounted on the forward positioned float unit (16) and is positioned partway along the forward positioned float unit, a tow bar (13) attached between the elongated rear float (12) and the forward positioned float unit (16) and the tow bar (13) extending forward directly from the hinge (20) toward a front of the forward positioned float unit (16), and vertical wings (18, 18') submerged in the water which are directly attached to the forward positioned float unit, said tow bar (13) is attached to a tow wire (8), and an actuator for adjusting an angle of attack in the water of the forward float unit (16) by directly adjusting a distance between the front of the forward positioned float unit (16) and a front of the tow bar (13).

2. The apparatus according to claim 1, whereas the actuator for adjusting the distance between the front of the forward positioned float unit (16) and the front of the tow bar (13) comprises one or a combination of;

a wire (30) and a motorized reel (34), a wire (30, 38) connected with a reel on the vessel, and a wire (30) connected with a hydraulic or an electric actuator (42).

3. The apparatus according to claim 2, whereas said wire (30) is connected between the forward positioned float unit

(16) and a point (11) on the tow bar (13), the length of the wire dictates the angle of attack of the forward positioned float unit.

4. The apparatus according to claim 1, whereas the actuator for adjusting the distance between the front of the forward positioned float unit (16) and the tow bar (13) comprises of a hydraulic or an electric actuator (42) connected between the forward positioned float unit and the point (11) on the tow bar (13), the length of an arm of the actuator dictates the angle of attack of the forward positioned float unit.

5. The apparatus according to claim 1, whereas said forward positioned float unit (16) is connected to and can steer an array of seismic equipment within a tow.

6. The apparatus according to claim 1, wherein the body is designed to position the marine seismic source equipment which is comprised of seismic guns relative to a streamer array (14) also being towed by the vessel.

* * * * *